(12) United States Patent
Myers et al.

(10) Patent No.: US 9,773,436 B2
(45) Date of Patent: *Sep. 26, 2017

(54) BEDDING PRODUCT WITH AGE INDICATOR

(71) Applicant: L&P Property Management Company, South Gate, CA (US)

(72) Inventors: Terrance L. Myers, Joplin, MO (US); John A. Garrett, Carthage, MO (US)

(73) Assignee: L&P Property Management Company, South Gate, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/982,229

(22) Filed: Dec. 29, 2015

(65) Prior Publication Data

US 2016/0203739 A1 Jul. 14, 2016
US 2017/0236456 A9 Aug. 17, 2017

Related U.S. Application Data

(63) Continuation of application No. 14/592,406, filed on Jan. 8, 2015, now Pat. No. 9,257,057, which is a
(Continued)

(51) Int. Cl.
*G06K 19/00* (2006.01)
*G09F 3/20* (2006.01)
(Continued)

(52) U.S. Cl.
CPC .............. *G09F 3/208* (2013.01); *A47C 21/00* (2013.01); *A47C 27/00* (2013.01); *A47C 27/002* (2013.01);
(Continued)

(58) Field of Classification Search
CPC ..... A47C 20/041; A47C 21/003; A47C 21/04; A47C 21/044; A47C 21/048; A47C 31/00; A47C 31/008; A47C 27/00; A47C 21/00; A47C 27/002; Y10S 901/01; G04F 3/06; G04F 3/08; G04F 1/005; G04B 47/00;
(Continued)

(56) References Cited

U.S. PATENT DOCUMENTS 4,426,157 A * 1/1984 Jetter .................. G04G 13/028
368/262
5,533,459 A 7/1996 Fontana
(Continued)

FOREIGN PATENT DOCUMENTS

WO 2011139671 11/2011

OTHER PUBLICATIONS

Bordeaux, QR Codes Provide Mobile Marketing In-Store, Sundog, Sep. 21, 2010, retrieved from internet: <URL: http://www.sundoginteractive.com/sunblog/posts/qr-codes-provide-mobile-marketing-in-store>, 2 pages.

*Primary Examiner* — Steven S Paik
*Assistant Examiner* — April Taylor
(74) *Attorney, Agent, or Firm* — Wood, Herron & Evans, LLP

(57) ABSTRACT

A mattress age indicating device includes an enclosure and an indicating assembly contained within the enclosure. The age indicating device may be configured to present an indication related to the mattress's age and may be coupled to the mattress or other bedding or seating product.

25 Claims, 11 Drawing Sheets

Related U.S. Application Data continuation-in-part of application No. 13/709,401, filed on Dec. 10, 2012, now Pat. No. 8,939,379, which is a continuation-in-part of application No. 13/406,053, filed on Feb. 27, 2012, now Pat. No. 8,870,083.

(51) Int. Cl.

| | | |
|---|---|---|
| G09F 3/00 | (2006.01) | |
| A47G 9/10 | (2006.01) | |
| A47C 31/00 | (2006.01) | |
| G06N 5/04 | (2006.01) | |
| A47C 21/00 | (2006.01) | |
| A47C 27/00 | (2006.01) | |
| G09F 13/22 | (2006.01) | |

(52) U.S. Cl.
CPC ............... *A47C 31/00* (2013.01); *A47G 9/10* (2013.01); *G06N 5/04* (2013.01); *G09F 3/00* (2013.01); *G09F 3/0297* (2013.01); *G09F 3/201* (2013.01); *G09F 13/22* (2013.01); *G09F 2013/222* (2013.01)

(58) Field of Classification Search
CPC ...... G09F 13/0413; G09F 13/20; G09F 13/22; G09F 3/0291; G09F 3/0297; G09F 3/18; G09F 3/185; G09F 3/20; G09F 3/201; G09F 3/208; G09F 2013/222; A61B 5/6897; A61B 5/6892; G08B 21/0461
USPC .......................................... 235/375, 487, 494
See application file for complete search history.

(56) References Cited

U.S. PATENT DOCUMENTS

| | | | |
|---|---|---|---|
| 5,555,223 A * | 9/1996 | Barainsky | G07C 1/02 |
| | | | 116/206 |
| 5,585,156 A * | 12/1996 | Fontana | B42D 15/00 |
| | | | 283/101 |
| 5,802,015 A | 9/1998 | Rothschild et al. | |
| 5,928,504 A | 7/1999 | Hembre et al. | |
| 6,255,801 B1 | 7/2001 | Chalasani | |
| 6,279,170 B1 | 8/2001 | Chu | |
| 6,337,836 B1 | 1/2002 | Eidelson | |
| 6,557,760 B2 | 5/2003 | Goodwin, III | |
| 6,750,772 B2 | 6/2004 | Skerker et al. | |
| 6,758,980 B2 | 7/2004 | Prater et al. | |
| 6,795,376 B2 | 9/2004 | Quine | |
| 6,826,119 B2 | 11/2004 | Fortune | |
| 7,079,019 B1 | 7/2006 | Ruggiero | |
| 7,177,557 B2 | 2/2007 | Kreckel | |
| 7,248,147 B2 * | 7/2007 | Debord | G01K 3/005 |
| | | | 340/309.16 |
| 7,346,944 B2 * | 3/2008 | Shaw | A61G 7/05776 |
| | | | 340/12.29 |
| 7,495,558 B2 | 2/2009 | Pope et al. | |
| 7,532,106 B2 | 5/2009 | Debord et al. | |
| 7,532,544 B2 * | 5/2009 | Morse | A61J 7/0472 |
| | | | 221/2 |
| 7,675,409 B2 | 3/2010 | Jensen et al. | |
| 8,559,278 B2 | 10/2013 | Braunberger | |
| 8,561,230 B2 * | 10/2013 | Shaw | A61G 7/05776 |
| | | | 340/870.01 |
| 8,870,083 B2 | 10/2014 | Myers et al. | |
| 8,939,379 B2 | 1/2015 | Myers et al. | |
| 9,257,057 B2 | 2/2016 | Myers et al. | |
| 2001/0036129 A1 * | 11/2001 | Carr | G04F 1/00 |
| | | | 368/109 |
| 2003/0029062 A1 * | 2/2003 | Esterman | G09F 3/10 |
| | | | 40/5 |
| 2005/0182513 A1 | 8/2005 | Ponsi et al. | |
| 2005/0278519 A1 | 12/2005 | Luebke et al. | |
| 2006/0181961 A1 | 8/2006 | Hobkirk | |
| 2006/0256664 A1 | 11/2006 | Varon | |
| 2007/0089433 A1 | 4/2007 | McDonnell et al. | |
| 2007/0091726 A1 | 4/2007 | Stauffer et al. | |
| 2007/0150378 A1 * | 6/2007 | Walker | G06Q 10/087 |
| | | | 705/26.8 |
| 2007/0284333 A1 | 12/2007 | Dunnigan | |
| 2008/0141460 A1 * | 6/2008 | Shaw | A61G 7/05776 |
| | | | 5/600 |
| 2008/0244834 A1 * | 10/2008 | McClintock | A47C 27/082 |
| | | | 5/694 |
| 2009/0125684 A1 | 5/2009 | Todd et al. | |
| 2009/0199857 A1 | 8/2009 | Peake et al. | |
| 2009/0201773 A1 | 8/2009 | Wilson et al. | |
| 2010/0051707 A1 | 3/2010 | Conzelmann | |
| 2010/0052908 A1 | 3/2010 | Doan et al. | |
| 2010/0134282 A1 | 6/2010 | Lumley | |
| 2010/0287057 A1 | 11/2010 | Aihara et al. | |
| 2012/0078421 A1 * | 3/2012 | Shaw | A61G 7/05776 |
| | | | 700/275 |
| 2012/0147712 A1 * | 6/2012 | Lynn | G04F 1/00 |
| | | | 368/89 |
| 2012/0204782 A1 | 8/2012 | Rubin | |
| 2013/0043988 A1 | 2/2013 | Bruno | |

\* cited by examiner

BEDDING PRODUCT WITH AGE INDICATOR

CROSS-REFERENCE TO RELATED APPLICATIONS

This application is a continuation of U.S. patent application Ser. No. 14/592,406 filed Jan. 8, 2015, now U.S. Pat. No. 9,257,057, which is a continuation-in-part of U.S. patent application Ser. No. 13/709,401 filed Dec. 10, 2012, now U.S. Pat. No. 8,939,379, which is a continuation-in-part of U.S. patent application Ser. No. 13/406,053 filed Feb. 27, 2012, now U.S. Pat. No. 8,870,083. Each of these documents is fully incorporated herein.

TECHNICAL FIELD

The present invention relates generally to age indicating devices for products, and may find application in bedding and seating products.

BACKGROUND

Most products have limited useful lifetimes, which generally span from when a product is new (or ready to be used) to when it fails to function properly and, consequently, may be less useful than when it was new. Thus, products go through several stages during their lifetimes, including what may be characterized as a beginning, a middle and an end. The lifetime of a product may be generally understood with reference to the nature of the product. For some products, their lifetime may be determined mostly by the passage of time. A piece of fruit, for example, generally has a lifetime that comes to an end when the piece of fruit becomes overripe and is no longer palatable, which happens with the passage of time. For some products, their lifetime may be determined primarily by the amount of use of the product. A traditional wooden pencil, for example, reaches the end of its lifetime after it is used and sharpened so many times that the wooden cylinder surrounding the graphite core cannot be sharpened any further, or until the wooden cylinder is reduced to a size where the pencil is no longer desirable for use. And for some products, their lifetime may be determined mostly by a combination of the passage of time and the amount of use of the product. A rubber bicycle tire, for example, may degrade and dry out over time and may be worn down by use.

Effective use of a product generally includes using the product during its useful lifetime, and discontinuing use of the product once the product reaches the end of its useful lifetime. Determining what stage of its lifetime a product is in may be difficult for a potential user, especially for a product that doesn't provide readily apparent indications about where it is along its useful life.

In some circumstances, a change in the user of a product may influence the product's useful lifetime. For example, a change in a user's health status might influence whether a particular product is still useful to the user. In addition, a change in a user's preferences might influence whether the user perceives the product as useful.

Mattresses provide an example of a product whose useful lifetime may be influenced by its age, use, and a user's preferences. A mattress typically includes a cover made of durable upholstery which may be partially or entirely covered by a mattress pad and/or sheets while the mattress is being used. Because of this covering, a superficial visual inspection of a mattress surface may not reveal the amount of use the mattress has seen or the age of the mattress, which may be factors in determining its useful life. A potential purchaser of the mattress may be deceived or misinformed regarding the remainder of the useful life of the mattress. Moreover, some mattress owners may find it difficult to recall exactly when the mattress was purchased or how long or how often the mattress has been used. The amount of time a mattress owner has owned a mattress may be relevant, as mattress owners may prefer different mattress qualities (such as stiffness) at different stages in their lives. Thus, mattresses in particular, and products generally present problems in terms of understanding how far along (or how far beyond) they are in their useful lifetime.

Different bedding products have different useful lifetimes. For example, the useful life of a pillow may be less than the useful life of a mattress.

Thus, a need exists in the art for an apparatus that may assist owners of bedding products with understanding when a bedding product is nearing the end, or has been used past the end of, its useful lifetime. Such apparatus may have application with respect to different bedding products including pillows, mattress toppers, box springs and mattresses, among others.

SUMMARY OF THE INVENTION

In one embodiment, a method for tracking an age of a bedding product is provided. The bedding product is of a bedding type of a plurality of bedding types, and each bedding type is associated with a recommended replacement age. The method includes receiving, by at least one processor, an input signal associated with the bedding type of the bedding product, and receiving, by the at least one processor, an initiation input. In response to receiving the initiation input, the method further includes starting a timer by the at least one processor. The method also includes providing, by the at least one processor and via an indicator, an indication of whether replacement of the bedding product is recommended based on the timer and the recommended replacement age of the bedding type associated with the input signal.

In another embodiment, a system for tracking the age of the bedding product is provided. The system includes at least one processor and a memory. The memory stores instructions that, when executed by the at least one processor, cause the system to receive an input signal associated with the bedding type of the bedding product, and receive an initiation input. In response to receiving the initiation input, the instructions upon execution cause the system to start a timer. The instructions upon execution further cause the system to provide, via an indicator, an indication of whether replacement of the bedding product is recommended based on the timer and the recommended replacement age of the bedding type associated with the input signal.

In another embodiment, a device for tracking the age of the bedding product is provided. The device includes a housing defining an interior, at least one processor positioned in the interior, an indicator coupled to the housing and the at least one processor, and a memory positioned in the interior. The memory stores instructions that, when executed by the at least one processor, cause the device to receive an input signal associated with the bedding type of the bedding product, and receive an initiation input. In response to receiving the initiation input, the instructions upon execution cause the device to start a timer. The instructions upon execution further cause the device to provide, via an indicator, an indication of whether replacement of the bedding product is recommended based on the timer and the recommended replacement age of the bedding type associated with the input signal.

BRIEF DESCRIPTION OF THE DRAWINGS

The accompanying drawings, which are incorporated in and constitute a part of this specification, illustrate embodiments of the invention and, together with the general description given above and the detailed description of the embodiments given below, serve to explain the principles of the invention. In the figures, corresponding or like numbers or characters indicate corresponding or like structures.

DETAILED DESCRIPTION OF THE ILLUSTRATIVE EMBODIMENTS

Figure 1:
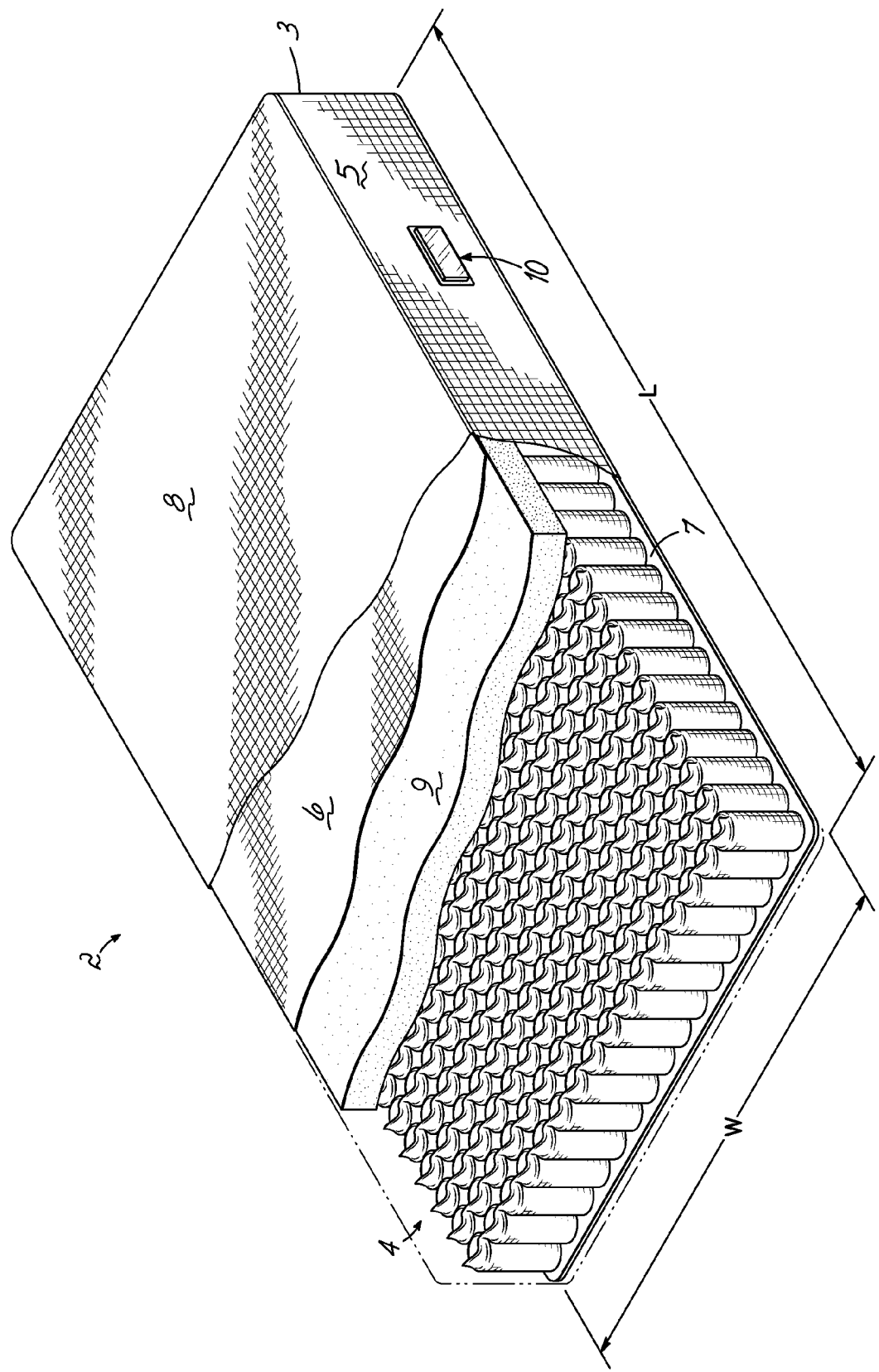
FIG. 1 is an isometric view of a mattress, partially disassembled, having an age indicating device attached to a side surface of the mattress.

Referring to FIG. 1, there is illustrated a single-sided mattress 2 incorporating this invention. This bedding product or mattress 2 comprises a pocketed spring core 4 over the top of which there is a conventional foam pad 9 covered by a fiber pad 6. This complete assembly is mounted upon a base 7 and is completely enclosed within an upholstered covering material 8. The mattress 2 has a longitudinal dimension or length "L" extending between end surfaces 3 of the mattress 2 (only one being shown) and a transverse dimension or width "W" extending between the side surfaces 5 of the mattress 2. Although the length is shown as being greater than the width, the length and width may be the same in the case of a square mattress. The present invention is not intended to limit the size or shape of the bedding product or mattress 2. Referring to FIG. 1, a mattress age indicating device 10 is secured to one of the side surfaces 5 of the mattress 2.

Figure 2:
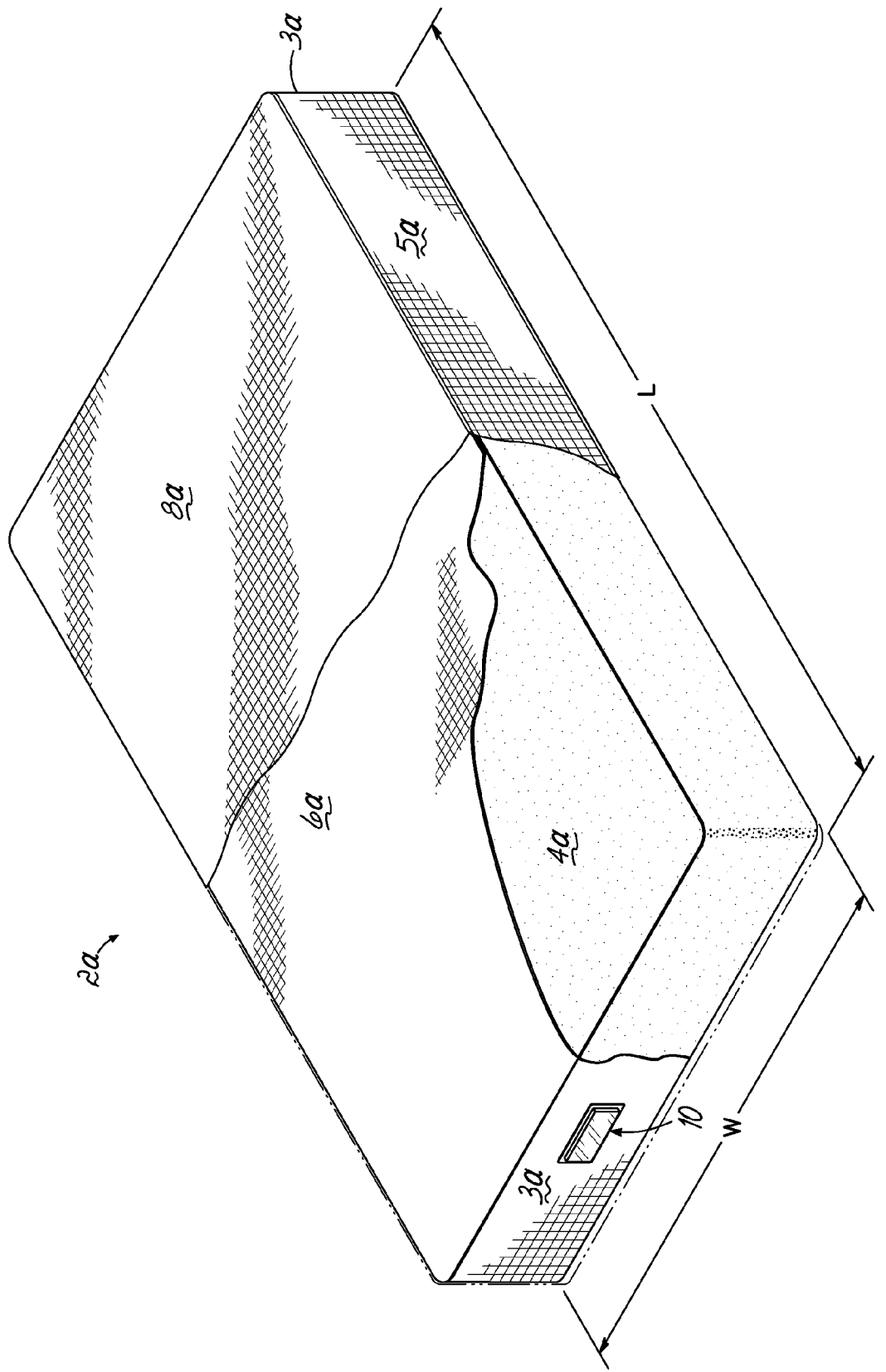
FIG. 2 is an isometric view of another mattress, partially disassembled, having an age indicating device attached to an end surface of the mattress.

FIG. 2 illustrates an alternative embodiment of mattress 2a comprising a foam core 4a over the top of which there is one or more fiber pads 6a. The foam core 4a and fiber pad or pads 6a are completely enclosed within an upholstered covering material 8a. The mattress 2a has a longitudinal dimension or length "L" extending between end surfaces 3a of the mattress 2a and a transverse dimension or width "W" extending between the side surfaces 5a of the mattress 2a. Although the length is shown as being greater than the width, the length and width may be the same in the case of a square mattress. The present invention is not intended to limit the size or shape of the bedding product or mattress 2a. Referring to FIG. 2, a mattress age indicating device 10 is secured to one of the end surfaces 3a of the mattress 2a. Although the mattress age indicating device 10 is shown secured to the mattress covering material in each of the mattresses 2 and 2a shown in FIGS. 1 and 2, respectively, the mattress age indicating device 10 may be secured to the mattress at any desired location. Although FIGS. 1 and 2 illustrate specific types of mattresses or bedding products, the mattress age indicator 10 of the present invention may be used with any known mattress or bedding product, either one-sided or two-sided, such as one incorporating non-pocketed coil springs secured together with helical lacing wires into a metal spring core, for example.

Figure 3:
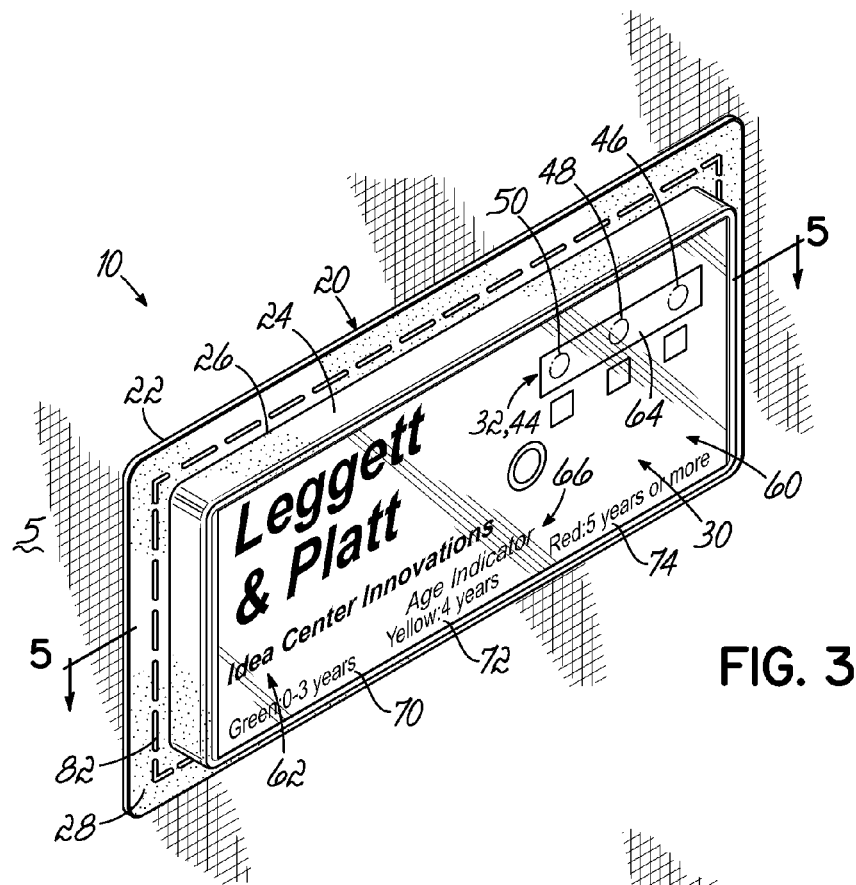
FIG. 3 is an isometric view of a product age indicating device attached to a surface by stitching.
Figure 3A:
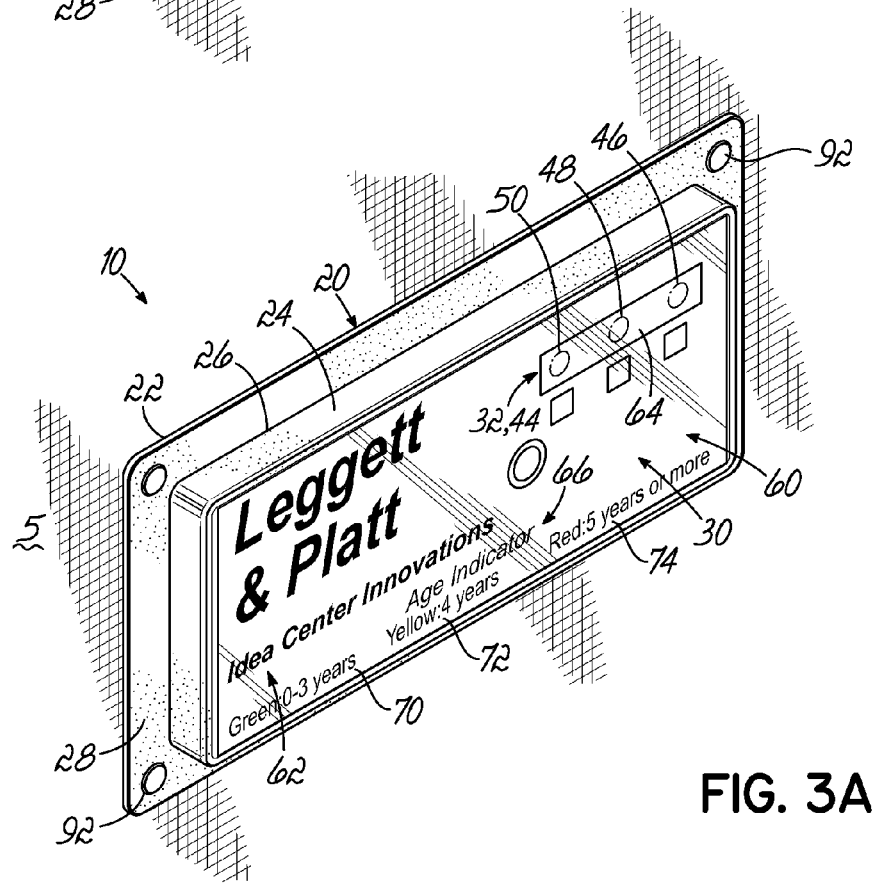
FIG. 3A is an isometric view of a product age indicating device attached to a surface by rivets.
Figure 4:
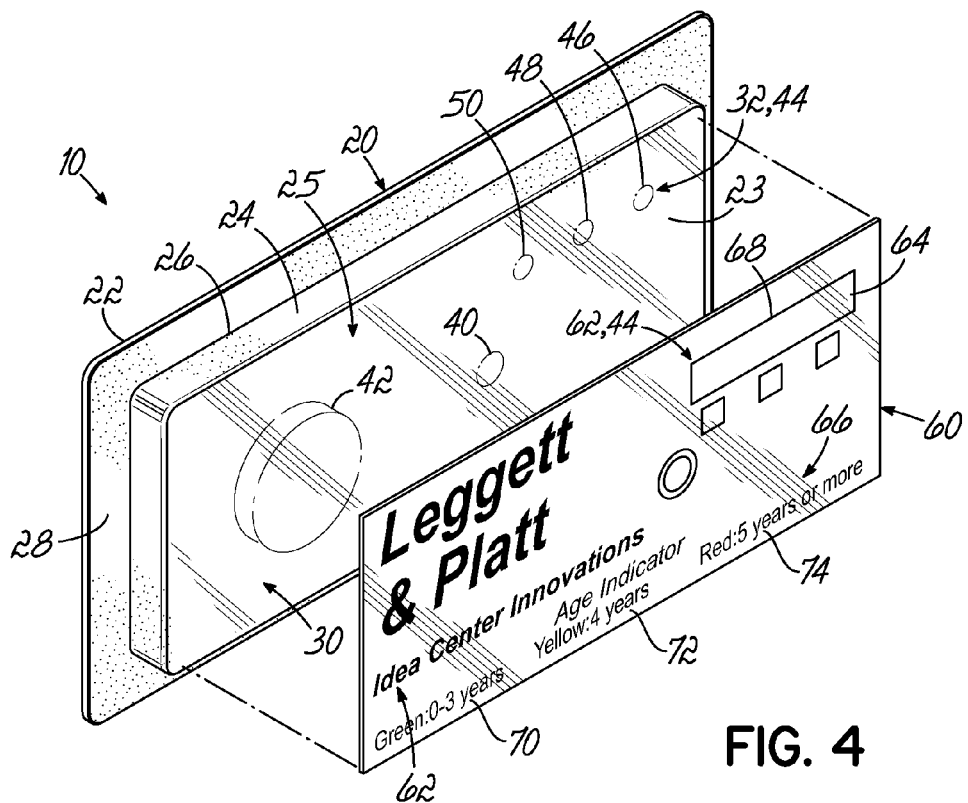
FIG. 4 is a partial disassembled isometric view of the product age indicator of FIG. 1, showing a label may be attached to an enclosure of the device.

Referring now to FIGS. 3, 3A, and 4, mattress age indicating device 10 includes an enclosure 20 and an indicating assembly 30. Many features of the product age indicating device 10 are discussed in the context of a mattress age indicating device, but other suitable applications for an age indicating device as disclosed herein will be appreciated.

The enclosure 20 contains and protects the indicating assembly 30, and includes a back 22, a front 23 and a continuous sidewall 24 defining an interior space 25. The indicating assembly 30 is located and positioned inside the interior space 25 of the enclosure 20. The back 22 and sidewall 24 of enclosure 20 are joined along an edge 26. A frame portion 28 of the back 22 extends outwardly from the edge 26 around the indicating assembly 30, and may be, for example, a continuation of the back 22, the sidewall 24, or both. In some embodiments, the frame portion 28 may provide a useful portion for attaching the age indicating device 10 to a surface, as will be described below. In some embodiments, the frame portion 28 may be omitted.

The enclosure 20 is designed to create an environment for the indicating assembly 30 that is impervious to the ingress of air, water, dust, fibers, or any other substance that might interfere with the function of the indicating assembly 30. The enclosure 20 may be made of any suitable material, such as, for example, plastic, rubber, rubberized polymers, and the like. In some embodiments, the back 22, the front 23, the sidewall 24, or any combination thereof, may be partially or substantially flexible, and, in some embodiments, the back 22, front 23 or the sidewall 24 may be sufficiently rigid to provide structural protection to the components of the indicating assembly 30, somewhat preventing them from being crushed.

In some embodiments, the entire enclosure 20 may be partially or substantially transparent, and in other embodiments, portions of the enclosure 20 may be partially or substantially transparent, including portions of the back 22, front 23 or the sidewall 24.

Figure 6:
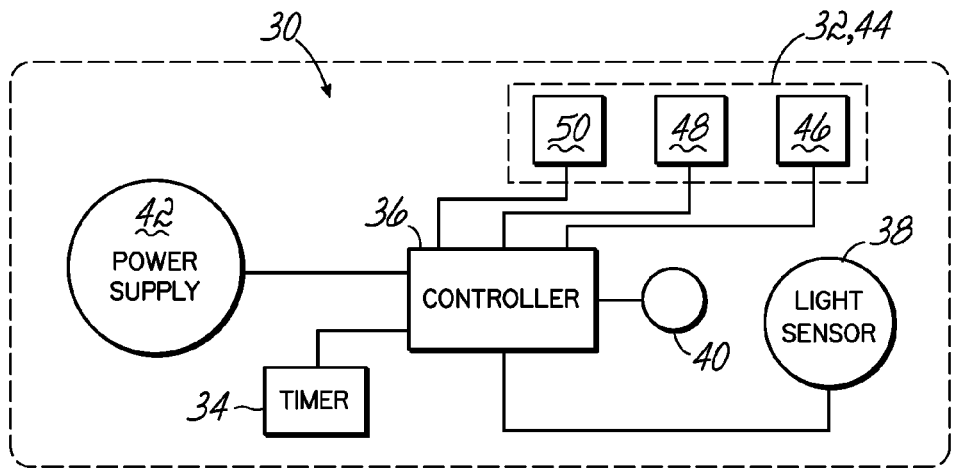
FIG. 6 is a schematic representation of an age indicating device.

Turning to the components of the indicating assembly 30 shown schematically in FIG. 6, they generally include an indicator 32, a timer 34, a controller 36, a light sensor 38, a test button 40, and a power source 42. The indicator 32, the timer 34, the light sensor 38, the test button 40, and the power source 42 are all operatively connected through the controller 36.

The controller 36 controls all of the components of the indicating assembly 30, including those discussed below. The controller 36 is in communication with and may gather information from, or send information to, the indicator 32, the timer 34, the light sensor 38, the test button 40, and the power source 42. For example, the controller 36 controls the activation and deactivation of the indicator 32.

The indicator 32 presents an indication to an observer relating to the age of an associated product, such as, for example, a mattress. The indicator 32 may be visual, auditory, or any other perceivable indication. In the figures, indicator 32 is a visual indicator 44 that includes an array of light emitting diodes (LEDs), including a red LED 46, a yellow LED 48, and a green LED 50. For such an arrangement, the controller 36 controls the visual indicator 44 and selectively activates and deactivates the LEDs 46, 48, and 50 to create an indication relating to the age of the mattress, as determined by the timer 34. For example, the green LED 50 could be activated when the mattress is nearly new, or when it is between zero and three years old. The yellow LED 48 could be activated when the mattress is in a middle stage of its lifetime, or when it is about four years old. And the red LED 46 could be activated when the mattress is near the end of its lifetime, or when it is five or more years old. The indicator 32 may be controlled by the controller 36 so that the indications it creates are presented on a predetermined interval, constantly, or otherwise. For example, the controller 36 may activate the indicator 32 on a daily basis. Other activation options may also be desirable. As one example, if a user presses the test button 40, the controller 36 may perform a single sequence where the indicator 32 is activated for 0.33 seconds, deactivated for 0.33 seconds, re-activated for 0.33 seconds, and then deactivated. As another example, if the light sensor 38 senses that the age indicating device 10 is exposed to light, the controller may perform a sequence where the indicator 32 is activated for 0.33 seconds, inactivated for 0.33 seconds, re-activated for 0.33 seconds, and then deactivated for 5 seconds. The controller 36 may repeat the sequence for 10 minutes, and then deactivate the indicator 32, unless the light sensor 38 senses that the age indicating device 10 is no longer exposed to light, in which case the controller 36 may deactivate the indicator 32. And, of course, an indicator may include other forms of a visual indicator, such as a one-LED or two-LED visual indicator, for example, color changing dyes or color changing materials, or any other suitable structure for creating a perceivable indication. A non-limiting example of another form that the indicator may have is an audible alarm or voice notice. The LED colors and ages used herein are merely exemplary; the present document is not intended to limit these colors or ages of the product indicated by these activated LEDs.

The timer 34 counts time and may include any suitable timing circuit or apparatus generally available in the marketplace, including quartz crystal timers. For a product whose lifetime is influenced by the passage of time, the timer 34 may provide information about the age of the product. Such may be useful, for example, if the product's owner is unaware of or cannot recall the age of the product. In the case of a mattress, the timer 34 may provide information about the age of the mattress, and this information is used by the controller 36 to provide an appropriate indication via the indicator 32, as discussed above.

The light sensor 38, which may be included in some embodiments, but not in others, may provide information to the controller 36 about whether the age indicating device 10 is exposed to light. Such information may be useful in the case of a mattress, as mattresses are often covered by a mattress pad and sheets. A user may not want any of the LEDs activated when the mattress is covered with a mattress pad and sheets. Such light may interfere with a user's sleep. However, the user may desire to know the age of the mattress or product when these items are removed from the mattress and the light sensor 38 is exposed to light. When the light sensor 38 is exposed to light, it may communicate with the controller 36 so that the indicator 32 is activated. In such a case, and especially where a visible indication is used, the indication created by the indicator 32 will be more readily perceived by a nearby user.

The light sensor 38 may also be configured to communicate with the controller 36 in a way that is relevant to the operation of the timer 34. For example, exposing the light sensor 38 to light could be an event that activates the timer 34 for the first time. Such activation could begin the timer 34 counting time, which may be associated with the starting point for an associated product's lifetime. The light sensor 38 may include any useful settings or characteristics. For example, in some embodiments, the indicator 32 is activated when the light sensor 38 is impinged by 100 or more lux of light, and the indicator 32 will remain activated when the light sensor 38 is exposed to more than 30 lux of light. If the light level drops below 30 lux, then the indicator 32 will be temporarily deactivated until the light sensor 38 is exposed to more than 30 lux of light again. Additionally or alternatively, the timer 34 may be initially activated by a user pushing the test button 40 three times or depressing test button 40 for a predetermined time (say five seconds). These numbers may be varied in select applications; it is not the intent of this document to limit these light levels or test button pushes or times to the examples provided.

Test button 40, which may be included in some embodiments, but not in others, may provide a way for a user to activate the indicator 32 and observe the indication relating to the age of the product. As discussed above, when the test button 40 is pressed, a sequence may be initiated where the controller 36 activates the indicator 32. Test button 40 may also be used to provide user input for testing, operating, or controlling any function of the indicating assembly 30.

All of the components of the indicating assembly, including the indicator 32, the timer 34, the controller 36, the light sensor 38, and the test button 40 may receive power from the power source 42, which may be, for example, a battery. The power source 42 may be chosen in view of an appropriate product lifetime for an associated product, and may, for example, include a CR2032 coin battery having a seven year battery life.

Indicia for use with the age indicating device 10 may also be provided and is shown in the form of a label 60. The label 60 is designed to be affixed to the age indicator, such as in the form of a sticker. The label 60 may include marketing information 62, such as the name or slogan of a mattress manufacturing retailer. For example, the figures show the marketing information 62 as, "Leggett & Platt" and "Idea Center Innovations." The label 60 shown in the figures also includes a window area 64 and a legend 66. The window area 64 includes one or more transparent panes 68 that are positioned so as to allow a visual indication from the age indicator to be perceived through the label 60, such as, for example, the indications created by a visual indicator including a red LED, a yellow LED, and a green LED, as discussed above with respect to the age indicating device 10. The window area 64 or the panes 68 may have any shape, including square, round, and the like. The legend 66 provides information to a user that may be used in conjunction with the indication, such as, "Green: 0-3 years" at 70, "Yellow: 4 years" at 72, and "Red: 5 years or more" at 74. Thus, a user observing a green LED 50 could easily read the legend 66 and determine that the mattress is between zero and three years old. Similar observations could be made when the mattress is four years old or five or more years old. The label 60 may also include a transparent pane in a region above a light sensor, and may include visual indications for a test button in a region above the test button. The ages may be varied as desired and are not intended to be limited to those shown or described. In some embodiments, all surfaces of the age indicating device 10 may be printed on or are configured for an adhesive label to be attached thereto.

Figure 5:
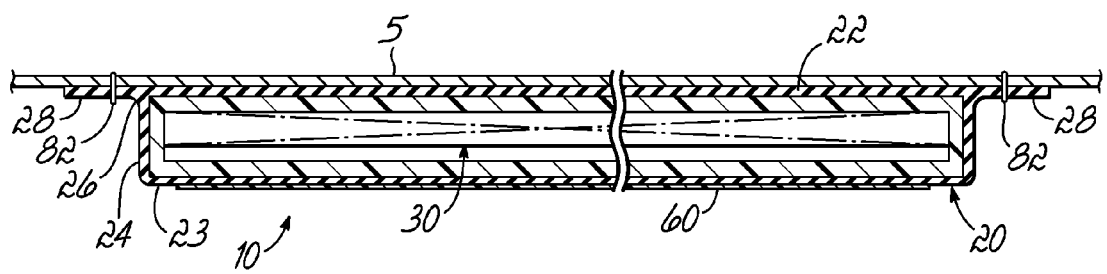
FIG. 5 is a cross-sectional view taken along line 5-5 of FIG. 3.
Figure 5A:
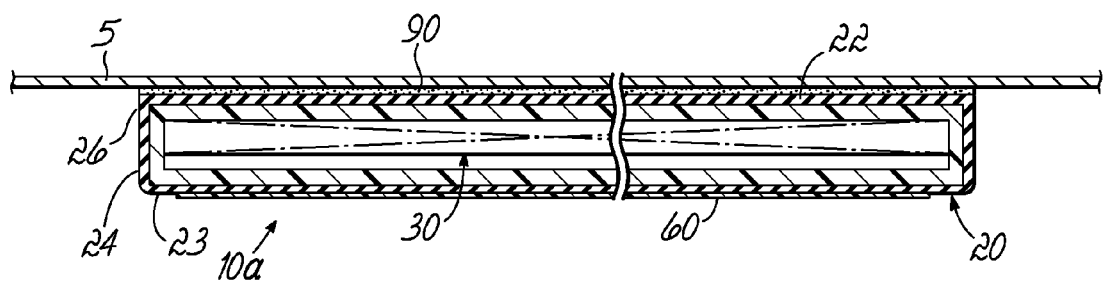
FIG. 5A is a cross-sectional view like FIG. 5 and showing an alternative embodiment of a product age indicator.

An age indicator, such as age indicating device 10, may be attached to a surface in any appropriate way and in any appropriate position. For example, FIG. 3 shows the age indicating device 10 attached to a side surface 5 of mattress 2 (as shown in FIG. 1). Stitching may be used to attach the age indicating device 10 to a surface, with the frame portion 28 of age indicating device 10 providing an area for stitching the age indicating device to the surface, such as what is shown at the stitching 82. Also, the age indicating device could be affixed to a mattress using adhesive, with the back 22 being affixed to the upholstery of the mattress. FIG. 5A shows an age indicating device 10a attached to the mattress surface 5 by an adhesive layer 90. Because adhesive layer 90 is used, the frame portion 28 is not included, and the age indicating device 10a is not stitched to the surface. In addition, the age indicating device could be inserted into a pocket on the mattress. Generally, an age indicating device may be coupled with an associated product, whether the associated product is a mattress or any other product.

FIG. 3A shows an age indicating device 10 attached to the mattress surface 5 by four buttons or rivets 92 (only three being shown). However, any number of rivets or buttons 92 may be used at any desired location.

The age indicating device 10 may be any useful size, and in some embodiments, has an overall size of 2"×3"×0.125".

In some embodiments that are not shown in the figures, an age indicator or age indicating device, such as what has been generally described herein, may be used in association with other products, non-limiting examples of which include pillows, mattress protectors, and baby car seats. Also, an age indicating device may include structure for transmitting information, such as information relating to the age of an associated product. In these or other embodiments, the age information may be wirelessly transmitted in a form that is readable by an associated remote assembly. An age indicating device may also include structure for determining the amount of use an associated product experiences.

It will be appreciated by those having skill in the art that any or all of the components of the indicating assembly 30 could be formed integral with any of the other components. For example, the timer could be formed integral with the controller. Also, an age indicator need not include all of the components discussed above. Moreover, the programming of an age indicator controller may be chosen so that indications are presented in any useful manner. For example, the controller may be programmed so that it activates the indicator when a product has reached the end of its useful life, which may take into account the passage of time, the amount of use experienced by a product, or both.

Figure 7:
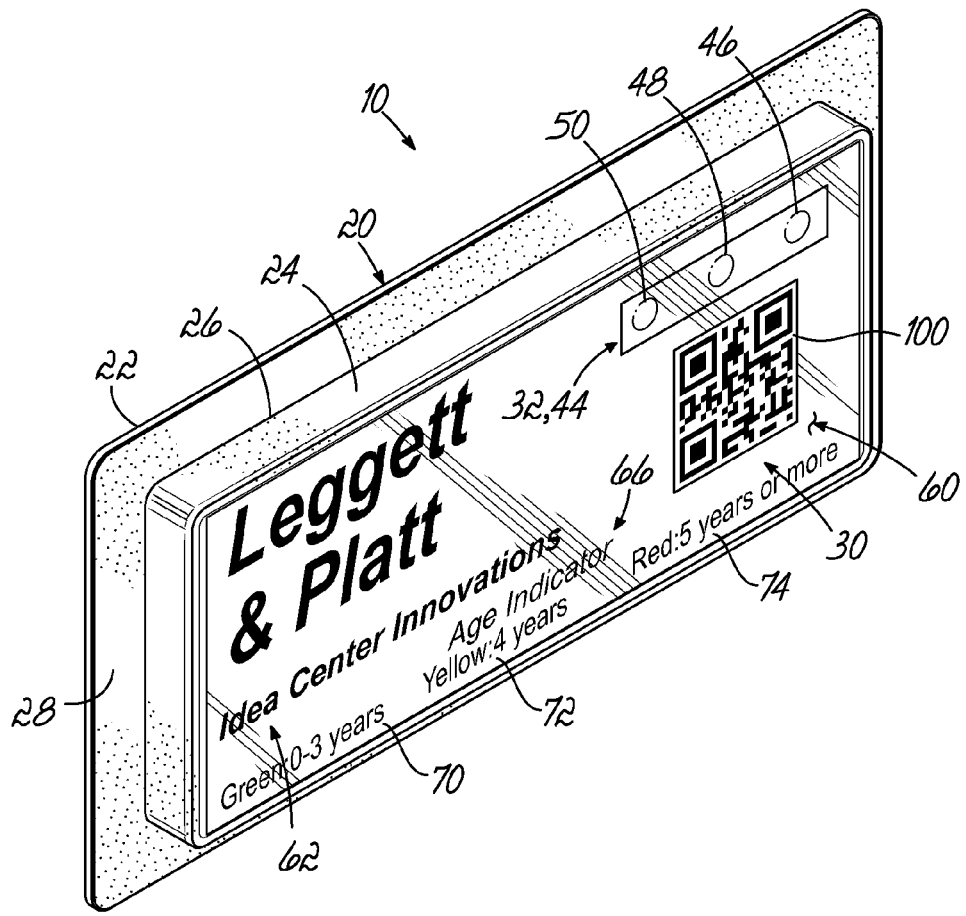
FIG. 7 is an isometric view of a product age indicating device showing another innovative aspect of the age indicating device.

In some embodiments, and with reference to FIG. 7, the age indicating device 10 may include a machine-readable barcode, such as a QR code 100, which is a two-dimensional barcode. Machines for reading the QR code 100 are known and do not require further explanation. The QR code 100 advantageously relates to, or is associated with, information relevant to the product to which the age indicating device 10 is attached. Non-limiting examples of the type of information that the QR code 100 may be related to or associated with include: the product's date of manufacture, the product's date of purchase, a projected expiration date for when the product has reached the end of its useful life, a website URL address, the name of the manufacturer, the name of the retail business where the product was purchased, instructions for care of the product, and any other information. The QR code 100 advantageously is positioned on a portion of the age indicating device that is accessible by a machine for reading it, such as, for example, on the label 60. The QR code 100 may be included with the age indicating device 10 when the age indicating device 10 is manufactured, or the QR code 100 may be supplied after the time of the age indicating device 10 is manufactured, such as in the form of a sticker that is adhered to the age indicating device.

Figure 8:
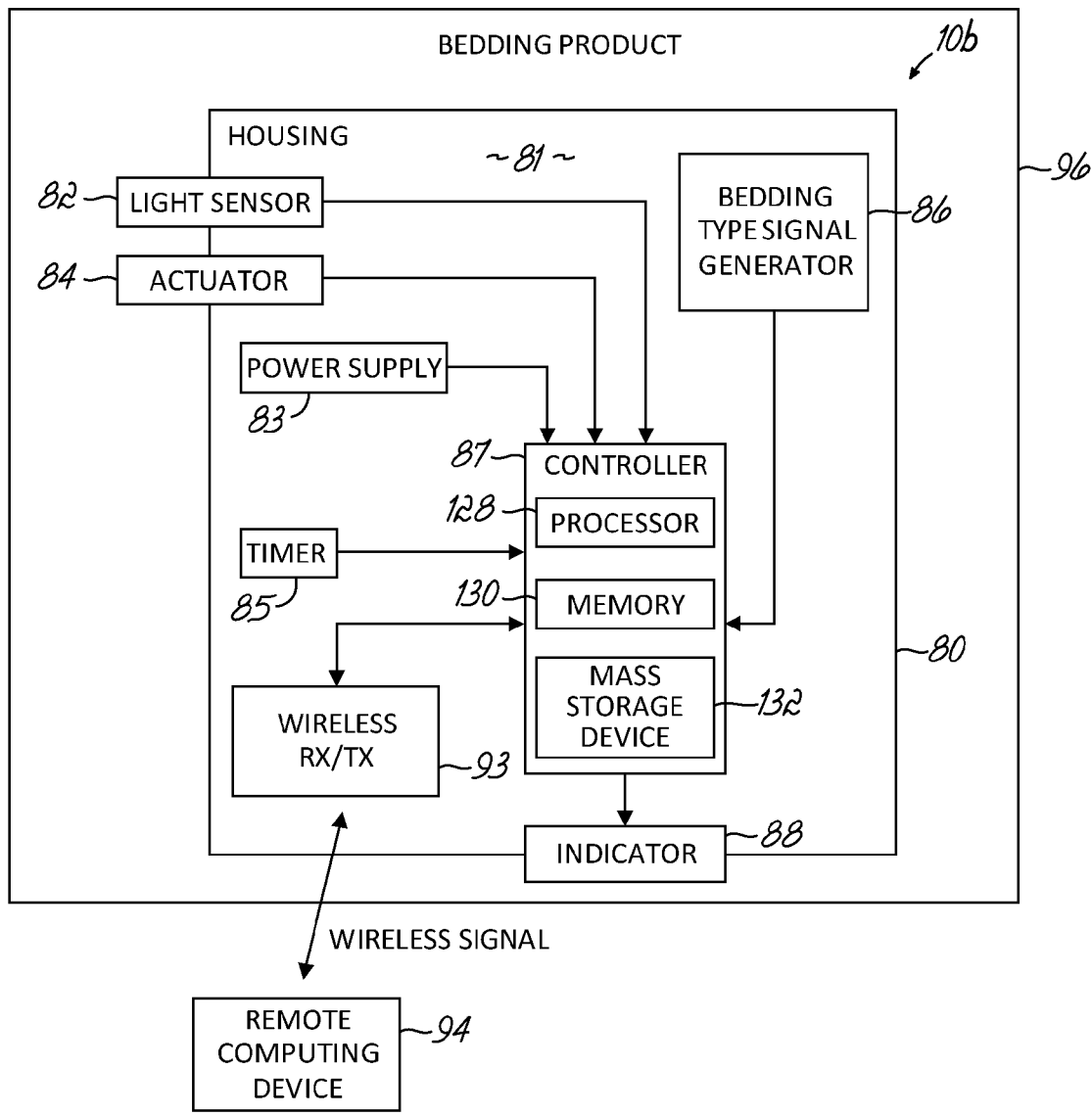
FIG. 8 is a schematic representation of an alternative age indicating device.
Figure 10:
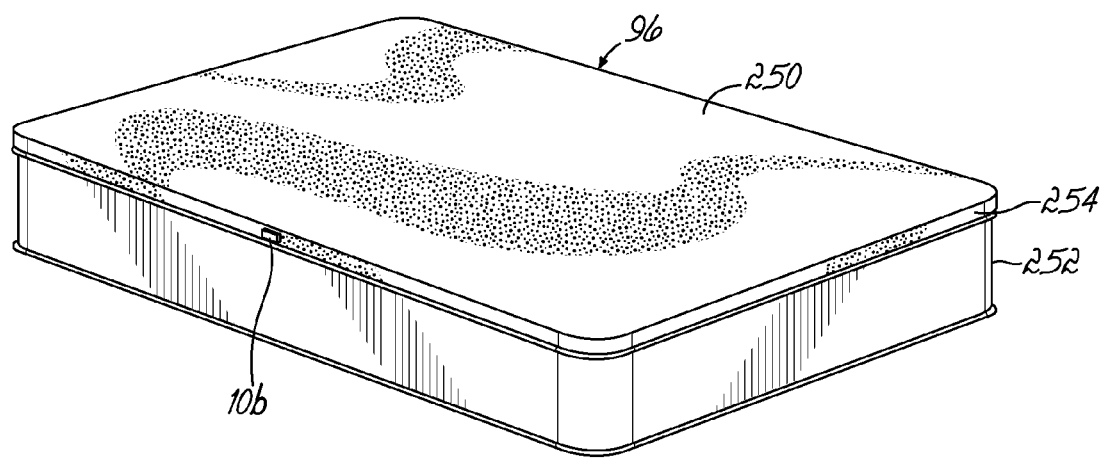
FIG. 10 is an isometric view of a mattress topper having an age indicating device coupled thereto.
Figure 11:
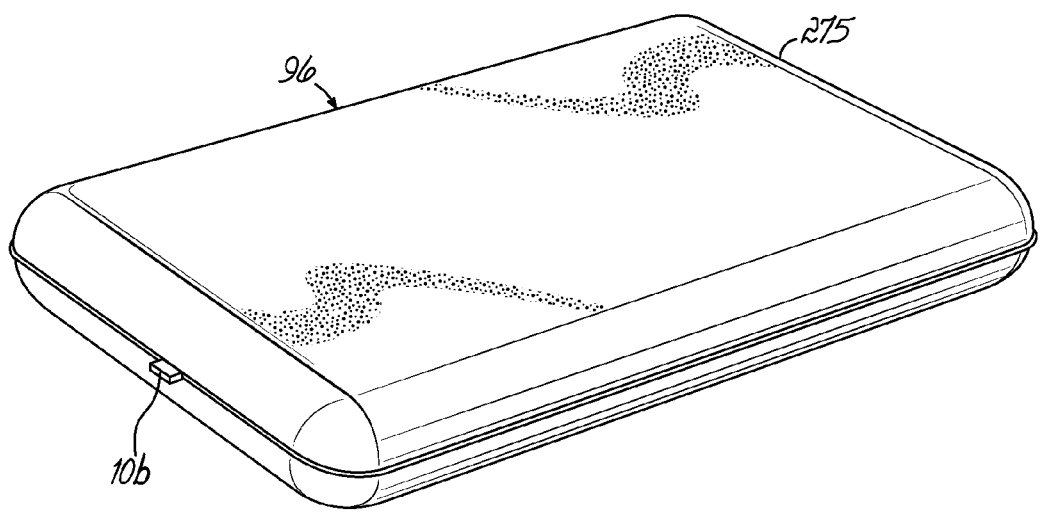
FIG. 11 is an isometric view of a pillow having an age indicating device coupled thereto.

FIG. 8 provides an exemplary age indicating device 10b, which is associated with, including being secured to, a bedding product 96 that is one of a plurality of bedding types. For example, the associated bedding product 96 may be a mattress pad and/or mattress topper type as shown in FIG. 10, a pillow type as shown in FIG. 11, or any other suitable type of bedding product. Each bedding type may vary in useful life and thus be associated with a different recommended replacement age. Hence, the age indicating device 10b is configurable so that it can track the age of the bedding product 96 associated therewith and provide indications that are tailored to the particular type of bedding product 96. In other words, the age indicating device 10b can tailor indications regarding whether replacement of a bedding product 96 is recommended based on the recommended replacement age specific to the type of bedding product 96.

Age indicating device 10b includes a housing 80, which may be equivalent or substantially similar to the enclosure 20 (FIG. 3). The housing 80 defines an interior space 81, which may be equivalent or substantially similar to the interior space 25 (FIG. 4). The interior space 81 includes a controller 87 positioned therein.

Age indicating device 10b also includes a light sensor 82, an actuator 84, a bedding type signal generator 86, and/or an indicator 88. Any one of the light sensor 82, the actuator 84, the bedding type signal generator 86, and the indicator 88 may be coupled to the housing 80, may be implemented in hardware and/or software, and/or may be integrated with another element. For example, the bedding type signal generator 86 may be implemented as hardware electronically coupled to the controller 87, as a software program stored and executed on the controller 87, or both. Any one of the light sensor 82, the actuator 84, the bedding type signal generator 86, and the indicator 88 may be entirely positioned in the interior space 81 of the housing 80 or, alternatively, be partially positioned in the interior space 81, such that some portion of the element extends outside of the housing 80. Alternatively, any one of the light sensor 82, the actuator 84, the bedding type signal generator 86, and the indicator 88 may be coupled to an exterior surface of the housing 80, such that the element is entirely positioned outside of the interior space 81.

The light sensor 82, actuator 84, controller 87, and/or indicator 88 may be equivalent or substantially similar to the light sensor 38, test button 40, controller 36, and indicator 32 of the embodiment of FIGS. 1-7, respectively (FIG. 6). As shown in FIG. 8, the interior space 81 defined by the housing 80 may include a timer or counter 85, such as timer 34 (FIG. 6), and may include a power supply 83, such as power source 42 (FIG. 6). As previously described, the timer or counter 85 may be separate from or integrated with the controller 87. Each of the light sensor 82, actuator 84, bedding type signal generator 86, indicator 88, counter/timer 85 and/or power source 83 are electronically coupled to the controller 87.

The actuator 84 includes any suitable structure for receiving an input representative of an actuation. For example, actuator 84 may include a button, such as test button 40 (FIG. 6), a motion sensor, an audio sensor, a pressure sensor, a touch sensor, a switch, or any other suitable technology. The actuator 84 is accessible from outside of the housing 80, meaning that input originating from outside the housing 80 can cause an actuation of the actuator 84. In this way, the actuator 84 may extend outside of the housing 80 from the interior space 81, may be fully positioned in the interior space 81 of the housing 80 behind an actuation-permeable portion thereof, or may be coupled to an exterior surface of the housing 80, such that the actuator 84 is entirely positioned outside of the interior space 81. For example, in the case of a button actuator, the button actuator may extend from the interior space 81 to outside the housing 80, and a user can press the button to cause an actuation. Alternatively, the button actuator may be fully positioned in the interior space 81 of the housing 80 behind a flexible portion thereof, and a user can press the flexible portion of the housing 80 to cause an actuation. In the case of an audio sensor actuator, for example, the audio sensor actuator is accessible from outside the housing 80 so long as the audio sensor can receive audio signals originating from outside the housing 80, such as through a portion of the housing 80 that includes a vent, aperture, or some other audio-permeable structure.

The light sensor 82 may also be accessible from outside of the housing 80, meaning that the light sensor is able to detect light exposure originating from outside of the housing 80. In this way, the light sensor 82 may extend from the interior space 81 to outside the housing 80, may be fully positioned in the interior space 81 of the housing 80 behind a light-permeable portion thereof (e.g., a window), or may be coupled to an exterior surface of the housing 80, such that the light sensor 82 is entirely positioned outside of the interior space 81. The act of the light sensor 82 detecting sufficient light exposure (e.g., exposure to more than a specified amount of light for a specified period of time) is hereinafter referred to as an actuation of the light sensor 82.

The indicator 88 includes any suitable apparatus for providing an indication relating to the bedding product 96 associated with the age indicating device 10b. For example, the indicator 88 may include one or more LEDs, an LCD screen, a speaker, a vibration unit, or the like. The indicator 88 is similarly accessible from outside of the housing 80, meaning that any indication from the indicator 88 is perceivable from outside of the housing 80. For example, if the indicator 88 is a visual indicator, then a user can view the indication from outside of the housing 80. Alternatively, if the indicator 88 is an audio indicator, then the user can hear the indication from outside the housing 80. The indicator 88 may extend from the interior space 81 to outside of the housing 80, may be fully positioned in the interior space 81 of the housing 80 behind an indication-permeable portion thereof (e.g., a window), or may be coupled to an exterior surface of the housing 80, such that the indicator 88 is entirely positioned outside of the interior space 81.

The bedding type signal generator 86 is configured to generate a signal relating to the type of the bedding product 96 associated with the age indicating device 10b. As described above, the useful life expectancy or recommended replacement age of a bedding product 96 may vary depending on the type. For example, a pillow may have a useful life expectancy of one (1) year, a mattress topper or pad may have a useful life expectancy of two (2) years, and a mattress may have a useful life expectancy of eight (8) years. These useful lives are purely for exemplary purposes and not intended to be limiting. In one embodiment, the bedding type signal generator 86 is configured to generate a signal indicative of the type of bedding product 96 associated with (including attached to) the age indicating device 10b. The controller 87 is configured to receive this signal from the bedding type signal generator 86 and apply the recommended replacement age associated with the indicated bedding type. For example, if the timer indicates that the associated bedding product 96 is one (1) year old, and the bedding type signal generator 86 generates a signal indicating a mattress type, then the controller 87 may be configured to cause the indicator 88 to indicate that the mattress is new or near new. Conversely, if the timer indicates that the associated bedding product 96 is one (1) year old, and the bedding type signal generator 86 generates a signal indicating a pillow type, then the controller 87 may be configured to cause the indicator 88 to indicate that the pillow has reached its recommended replacement age. In addition, or alternatively, the bedding type signal generator 86 may generate a signal that indicates the type of bedding product 96 associated with the age indicating device 10b and the recommended replacement age of the bedding product 96. It is possible the bedding type signal generator 86 may inform the controller 87 only of the recommended replacement age, and not the type, of the bedding product 96 associated therewith. However, in most instances, the bedding type signal generator 86 will inform the controller 87 of the type of the bedding product 96 associated therewith, and the controller 87 will know the recommended replacement age of the bedding type.

In one embodiment, age indicating device 10b is coupled to the bedding product 96 associated therewith, such as by buttons, rivets, stitching, adhesive, or any other suitable apparatus for affixing a device to a bedding product. In alternative embodiments, the age indicating device 10b may be separated from (not attached to) the bedding product 96. In some instances, the age indicating device 10b may be packed with and sold with a bedding product 96, but not attached to the product. The customer may initially activate the age indicating device 10b and then store the age indicating device 10b separately from the bedding product 96 (in a drawer for example). Every so often the customer may check the status of the age indicating device 10b to determine whether the bedding product 96 needs to be replaced. Additionally, the age indicating device 10b may be implemented as a stand-alone device, as part of a smart phone, tablet, laptop, or other portable device, or as part of a home computer, such as a desktop.

In some embodiments, the age indicating device 10b also includes a wireless receiver/transceiver 93 configured to communicate with a remote computing device 94, such as via Wi-Fi, Bluetooth, or any other suitable protocol. In this way, the controller 87 is enabled to wirelessly send information relating to the bedding product 96, such as its age and/or whether replacement of the bedding product 96 is recommended, to the remote computing device 94. As one non-limiting example, remote computing device 94 may include a laptop computer, a desktop, a tablet, a cellular phone, or any like device suitable for receiving information from the age indicating device 10b.

Upon or after receiving information from the age indicating device 10b, the remote computing device 94 may be configured to generate a notification based on the received information, such as a notification of the age of the bedding product 96 and/or an indication of whether replacement of the bedding product 96 is recommended. In some embodiments, information is automatically transmitted between the age indicating device 10b and the remote computing device 94 on an event-driven basis, such as once the bedding product 96 reaches or nears its recommended replacement age. In addition, or alternatively, information may be transmitted at regular intervals or on-demand from the remote computing device 94.

Remote computing device 94 may operate in conjunction with the actuator 84, indicator 88 and/or bedding type signal generator 86 of the age indicating device 10b. Alternatively, remote computing device 94 may replace one or more of these elements. In other words, remote computing device 94 may function as the actuator 84, bedding type signal generator 86, and/or indicator 88. For example, remote computing device 94 may include an actuator 84 implemented in hardware and/or software. Upon actuation of the actuator 84 on the remote computing device 94, remote computing device 94 may be configured to transmit a signal indicative of the actuation to the controller 87 of the age indicating device 10b via the wireless receiver/transceiver 93. Furthermore, remote computing device 94 may be configured to generate an indication via an indicator of the remote computing device 94, such as a display screen, relating to the bedding product's age or whether replacement of the bedding product 96 is recommended.

Remote computing device 94 may also include a bedding type signal generator 86 implemented in hardware and/or software that is configured to generate a signal indicative of the type of bedding product 96 (or a recommended replacement age of the bedding product 96). In one embodiment, the remote computing device 94 transmits this signal to the age indicating device 10b, which utilizes the signal to determine a relevant recommended replacement age for comparison with the timer as described above. In other embodiments, the remote computing device 94 is configured to wirelessly receive age information for the bedding product 96 from the age indicating device 10b and compare the received age with the recommended replacement age of the bedding type indicated in the signal. In this way, the remote computing device 94 is able to determine whether replacement of the bedding product 96 is recommended and provide a corresponding indication, such as via a display screen of the remote computing device 94.

The controller 87 (and remote computing device 94) may include a processor 128, a memory 130, and a mass storage memory device 132. The controller 87 may also include an input/output (I/O) interface and a Human Machine Interface (HMI). The controller 87 may be coupled to one or more external resources, devices, and/or systems, such as the light sensor 82, the actuator 84, the bedding type signal generator 86, the indicator 88, the wireless receiver/transceiver 93, and/or the remote computing device 94, via a network and/or the I/O interface. Alternatively, any one of the light sensor 82, the actuator 84, the bedding type signal generator 86, the indicator 88, and the wireless receiver/transceiver 93 may be integrated with the controller 87. Additional external resources, devices, and/or systems may include, but are not limited to, servers, databases, mass storage devices, peripheral devices, cloud-based network services, or any other suitable computer resource that may be used by the controller 87.

The processor 128 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 130. Memory 130 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or any other device capable of storing information. The mass storage memory device 132 may include data storage devices, such as a hard drive, optical drive, tape drive, non-volatile solid state device, or any other device capable of storing information.

Processor 128 may operate under the control of an operating system that resides in memory 130. The operating system may manage computer resources so that computer program code embodied as one or more computer software applications, such as an application residing in memory 130, may have instructions executed by the processor 128. In an alternative embodiment, the processor 128 may execute the application directly, in which case the operating system may be omitted. As one example, a control module 352 (FIG. 13) may be at least part of an application stored in the memory 130. One or more data structures may also reside in memory 130 and may be used by the processor 128, operating system, or application to store or manipulate data.

The I/O interface of the controller 87 may provide a machine interface that operatively couples the processor 128 to other external resources, devices, and/or systems, such as a network, the light sensor 82, the actuator 84, the bedding type signal generator 86, the indicator 88, the wireless receiver/transceiver 93, and/or the remote computing device 94. The application may thereby work cooperatively with the external resources, devices, and/or systems by communicating via the I/O interface to provide the various features, functions, applications, processes, or modules comprising embodiments of the invention. The application may also have program code that is executed by one or more external resources, devices, and/or systems, or otherwise rely on functions or signals provided by the one or more external resources, devices, and/or systems. Indeed, given the nearly endless hardware and software configurations possible, persons having ordinary skill in the art will understand that embodiments of the invention may include applications that are located externally to the controller 87, distributed among multiple controllers or other external resources, or provided by computing resources (hardware and software) that are provided as a service over a network, such as a cloud computing service.

The HMI of the controller 87 may be operatively coupled to the processor 128 of controller 87 in a known manner to allow a user to interact directly with the controller 87. The HMI may include video or alphanumeric displays, a touch screen, a speaker, and any other suitable audio and visual indicators capable of providing data to the user. The HMI may also include input devices and controls, such as an alphanumeric keyboard, a pointing device, keypads, pushbuttons, control knobs, microphones, etc., capable of accepting commands or input from the user and transmitting the entered input to the processor 128. In one exemplary embodiment, the HMI includes the light sensor 82, the actuator 84, the bedding type signal generator 86, and/or the indicator 88.

A database may reside on the mass storage memory device 132, and may be used to collect and organize data used by the various systems and modules described herein. The database may include data and supporting data structures that store and organize the data. In particular, the database may be arranged with any database organization or structure including, but not limited to, a relational database, a hierarchical database, a network database, or combinations thereof. A database management system in the form of a computer software application executing as instructions on the processor 128 may be used to access the information or data stored in records of the database in response to a query, where a query may be dynamically determined and executed by the operating system, other applications, or one or more modules. In one embodiment, the database includes stored bedding types, each associated with a recommended replacement age. Thus, upon receiving a signal indicating a type of bedding product, the receiving device, such as the controller 87, may retrieve the recommended replacement age associated with that bedding type.

Figure 9:
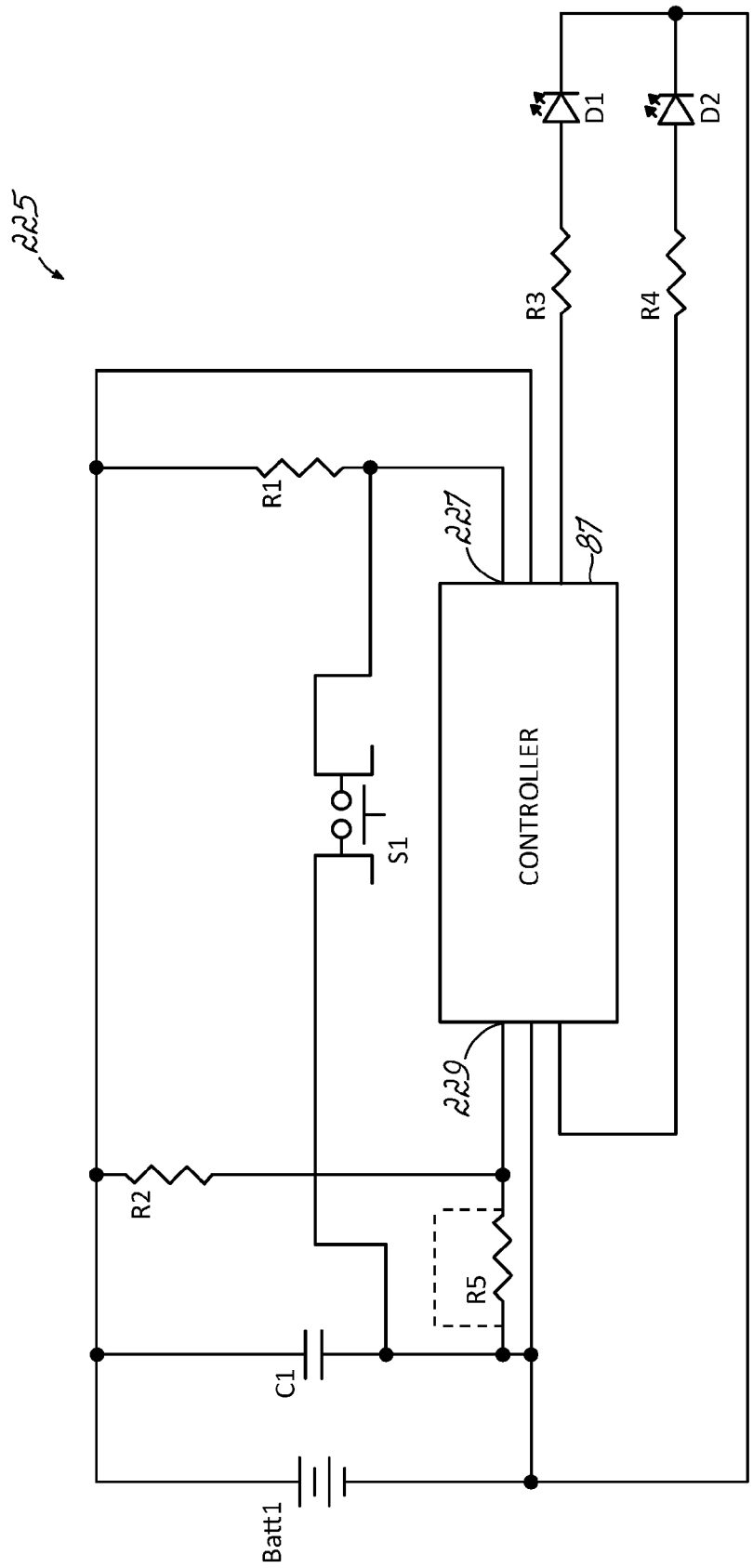
FIG. 9 is diagram of a circuit for implementing the features of an age indicating device.

FIG. 9 provides an exemplary circuit 225 for implementing the controller 87, actuator 84, indicator 88, and bedding type signal generator 86 of age indicating device 10*b*. In circuit 225, the indicator 88 is provided via a red LED D1 and a green LED D2, each of which are electrically coupled to the controller 87. Actuator 84 is provided by switch S1. When the switch S1 is actuated, the circuit 225 is configured such that a pin 227 of the controller 87 is set to "low." The controller 87 is configured to recognize the "low" pin 227 as relating to an actuation.

The bedding type signal generator 86 may include a circuit component that is either populated or non-populated in the age indicating device 10*b*, such as during manufacturing of the device. Population (or inclusion) of the circuit component results in the generation of a signal associated with one bedding type, and non-population (or non-inclusion) of the circuit component results in the generation of a signal associated with another bedding type. The circuit component may include a resistor, switch, button, jumper, or any other like circuit component that would be recognized as suitable by those skilled in the art. In the case of a switch or button, for example, the switch or button may be considered populated or non-populated depending on its selected position. The switch may be a multi-position switch that enables selection between two or more bedding types.

In circuit 225, for example, a resistor R5 represents the circuit component of the bedding type signal generator 86. When the resistor R5 is included in the circuit 225, and upon the application of power from the battery Batt1, the circuit 225 is configured such that a pin 229 of the controller 87 is set to "high." The controller 87 is configured to recognize the "high" pin 229 as being associated with a particular type of bedding product or recommended replacement age. Conversely, if the resistor R5 is not included in the circuit 225 (represented in FIG. 12 by dashed lines), then the circuit 225 is configured such that the pin 229 is set to "low." The controller 87 is configured to recognize the "low" pin 229 as being associated with another type of bedding product or recommended replacement age. Thus, when manufacturing the age indicating device 10*b* with the circuit 225, a manufacturer can select a particular type of bedding product for the device by merely including (or not including) the resistor R5.

FIG. 10 illustrates an exemplary embodiment in which the age indicating device 10*b* is associated with a mattress topper type bedding product. More particularly, the age indicating device 10*b* is coupled to a mattress topper 250 that lies atop a mattress 252. The mattress topper 250 may be secured to the mattress 252 via an elastic flange 254 that extends from the mattress topper 250 and around the top edge of the mattress 252. The mattress topper 250 may also include a compressing surface adjacent to an upper surface of the mattress 252 that protects and/or improves comfort of the mattress 252.

As illustrated, the age indicating device 10*b* may be coupled to the flange 254 of the mattress topper 250, thereby enabling a user of the mattress topper 250 and mattress 252 to avoid potential discomfort caused by lying on or rolling over the age indicating device 10*b*. However, in other embodiments, the age indicating device 10*b* may be coupled elsewhere to the mattress topper 250, such as on a top, bottom, or side surface of the mattress topper 250 and/or in a corner of the mattress topper 250. Moreover, while the age indicating device 10*b* is illustrated as being coupled to the mattress topper 250 on an outside surface of the flange 254, the age indicating device 10*b* may alternatively be coupled to any surface of the flange 254 or mattress topper 250 such that the device is provided between the mattress 252 and the flange 254 or mattress topper 250. The age indicating device 10*b* may be coupled to the mattress topper 250 via any method discussed herein or any other method that would be recognized as suitable by those skilled in the art.

FIG. 11 provides an exemplary embodiment in which the age indicating device 10*b* is associated with a pillow type bedding product. More particularly, the age indicating device 10*b* is coupled to a side surface of a pillow 275, thereby enabling use of the pillow without potential discomfort caused by direct or indirect contact with the age indicating device 10*b*. Alternatively, the age indicating device 10*b* may be fixed to other areas of the pillow 275, such as a bottom surface or a top service and/or a corner of the pillow 275. The device 10*b* is illustrated as having a tag-like appearance with one end being stitched into a seam of the pillow 275. Alternatively, the age indicating device 10*b* may be coupled to the pillow 275 via any method discussed herein or any other method that would be recognized as suitable by those skilled in the art.

Figure 12:
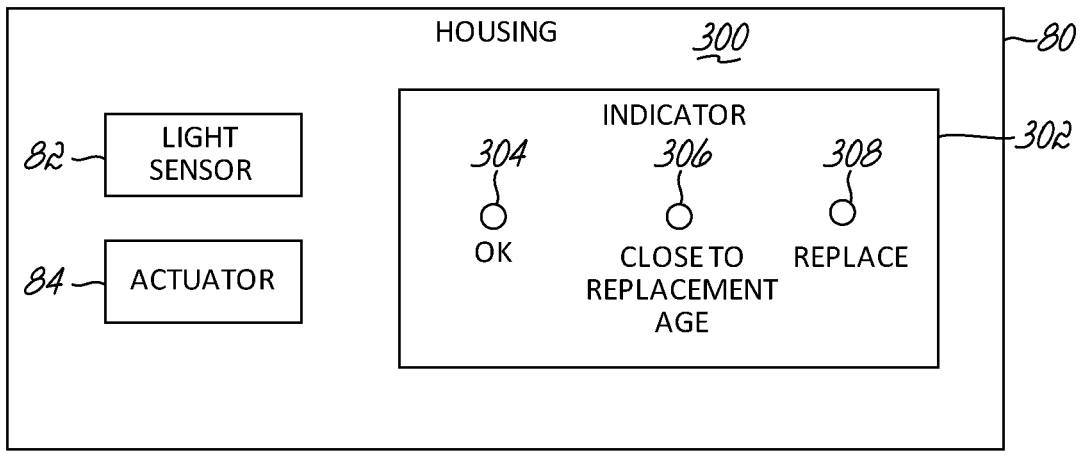
FIG. 12 is a schematic representation of an indicator of an age indicating device.

FIG. 12 illustrates an exemplary embodiment of the indicator 88 of the age indicating device 10*b*. More particularly, an exterior surface 300 of the housing 80 facilitates access to a visual indicator 302, such that indications from the visual indicator 302 are perceivable from outside of the housing 80. Visual indicator 302 includes LEDs 304, 306, and/or 308. Each of LEDs 304, 306, and 308 are associated with a current status of the bedding product, such as the bedding product being near new or "ok", the bedding product being close to its recommended replacement age, and replacement of the bedding product being recommended. The LEDs 304, 306, and 308 may be green, yellow, and red respectively. In some embodiments, the visual indicator 302 may only include two LEDs, such as LED 304 and LED 308.

The exterior surface 300 also facilitates access to the light sensor 82 and/or actuator 84 from outside the housing 80. In this way, the light sensor 82 may detect light exposure originating from outside of the housing 80, and the actuator 84 may receive an actuation input from outside of the housing 80. In response to a sufficient actuation of the light sensor 82 or the actuator 84, such as for a set period of time, the age indicating device 10b may be configured to cause illumination of one of the LEDs 304, 306, and 308 and thereby indicate whether replacement of the bedding product is recommended. For example, upon an actuation of the light sensor 82 or the actuator 84 for a set period of time, such as two seconds, if the current age of the bedding product falls within a set range including zero, then LED 304 may be illuminated. Alternatively, if the current age of the bedding product falls within a set range that neither includes zero nor the bedding product's recommended replacement age, then LED 306 may be illuminated. Finally, if the current age of the bedding product falls within a set range that includes the bedding product's recommended replacement age, or alternatively, the age of the bedding product exceeds the recommended replacement age, then LED 308 may be illuminated. As used herein, a set range may be defined by one or more age values, one or more percentages relative to the recommended replacement age, or both.

Figure 13:
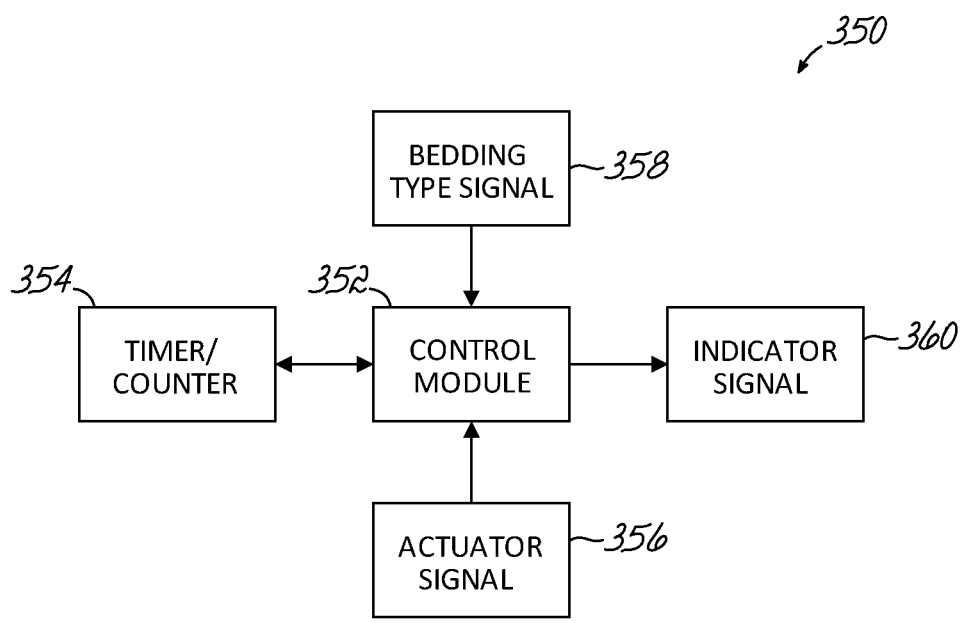
FIG. 13 is a schematic representation of an age indicating system.

FIG. 13 provides an exemplary age indicating system 350. Age indicating system 350 includes a control module 352 and a timer/counter 354. Age indicating system 350 may be provided by the light sensor 82, actuator 84, bedding type signal generator 86, controller 87, power supply 83, timer 85 and/or indicator 88 of the age indicating device 10b. For example, the control module 352 and/or the timer/counter 354 may be provided by the controller 87 of the age indicating device 10b.

In operation, the control module 352 receives an actuator signal 356 that represents an actuation, such as from the light sensor 82 or the actuator 84 of the age indicating device 10b. If the actuator signal 356 represents an initiation input, which may include an actuation of the actuator 84 for a set period of time, such as ten (10) seconds, then control module 352 starts the timer/counter 354. In general, a "counter" counts the occurrence of events. A "timer" may include a traditional timer that tracks seconds, minutes, hours, days, etc. Alternatively, a timer may include one or more counters, each which count a total passage of a single time interval (e.g., a counter that is incremented every hour).

Control module 352 also receives a bedding type signal 358 associated with a bedding type of a bedding product associated with the age indicating system 350. The bedding type signal 358 may be generated by the bedding type signal generator 86 of the age indicating device 10b. As previously described, each type of bedding product is associated with a recommended replacement age. Based on the bedding type signal 358, the control module 352 is able to determine a recommended replacement age for comparison with the timer/counter 354. In some embodiments, the bedding type signal 358 indicates the type of bedding product. In this case, upon receiving the bedding type signal 358, the control module 352 may query a database or other storage structure to retrieve the recommended replacement age associated with the indicated bedding type. In other embodiments, the bedding type signal 358 directly indicates the recommended replacement age rather than the bedding type.

Upon receiving an actuator signal 356 representative of a status check input, which may include an actuation of the light sensor 82 or actuator 84 of the age indicating device 10b for a set period of time, such as two (2) seconds, the control module 352 is configured to provide an indicator signal 360 that indicates whether replacement of the bedding product is recommended. The provided indicator signal 360 is based on a comparison between the timer/counter 354 and the recommended replacement age of the bedding type indicated in the bedding type signal 358. Indicator signal 360 is configured to cause generation of an appropriate indication based on the comparison, such as causing an LED associated with an outcome of the comparison to illuminate.

Figure 14:
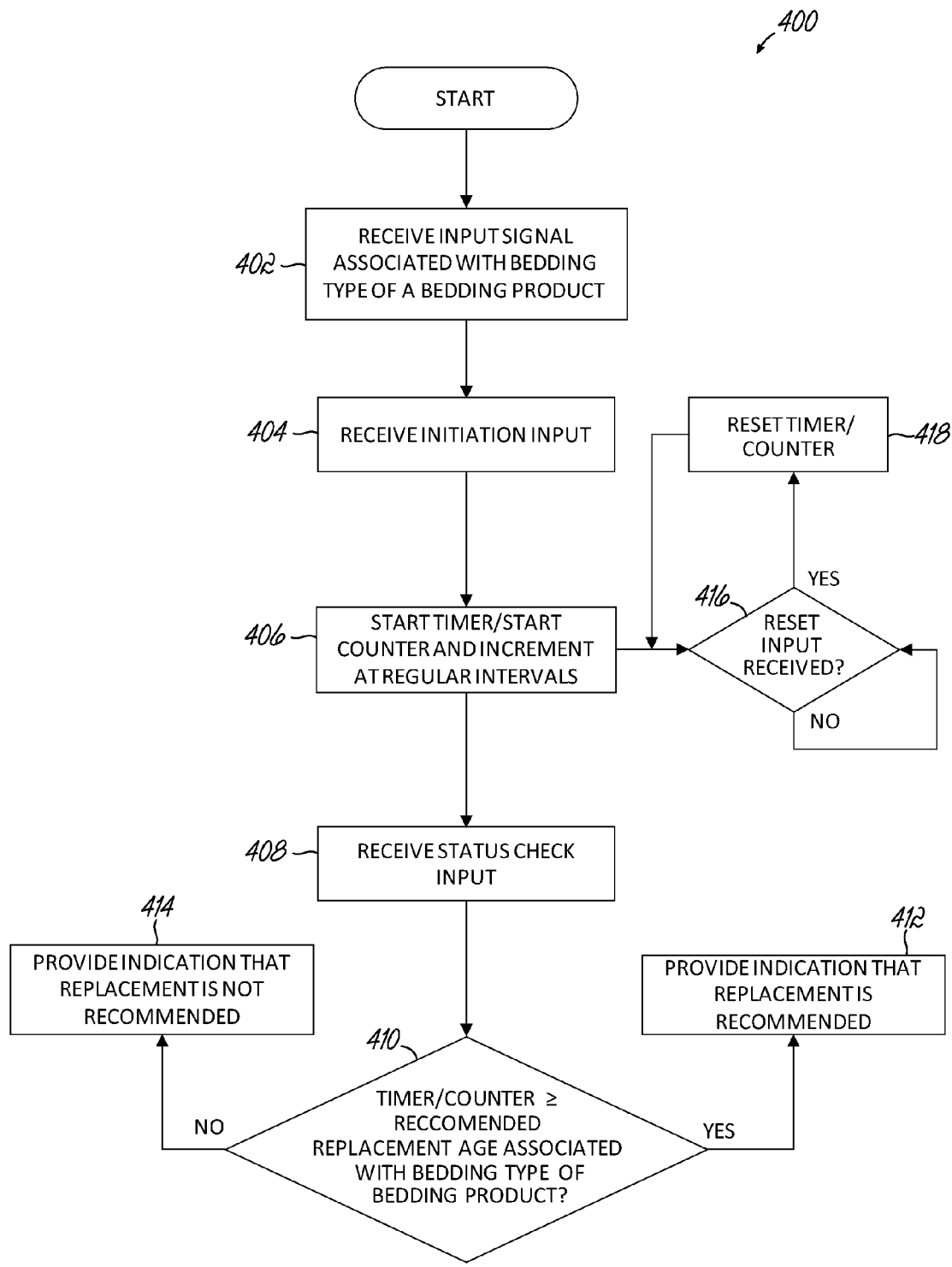
FIG. 14 is a flowchart of a method for tracking the age of a bedding product and providing an indication of whether replacement of the bedding product is recommended.
Figure 15:
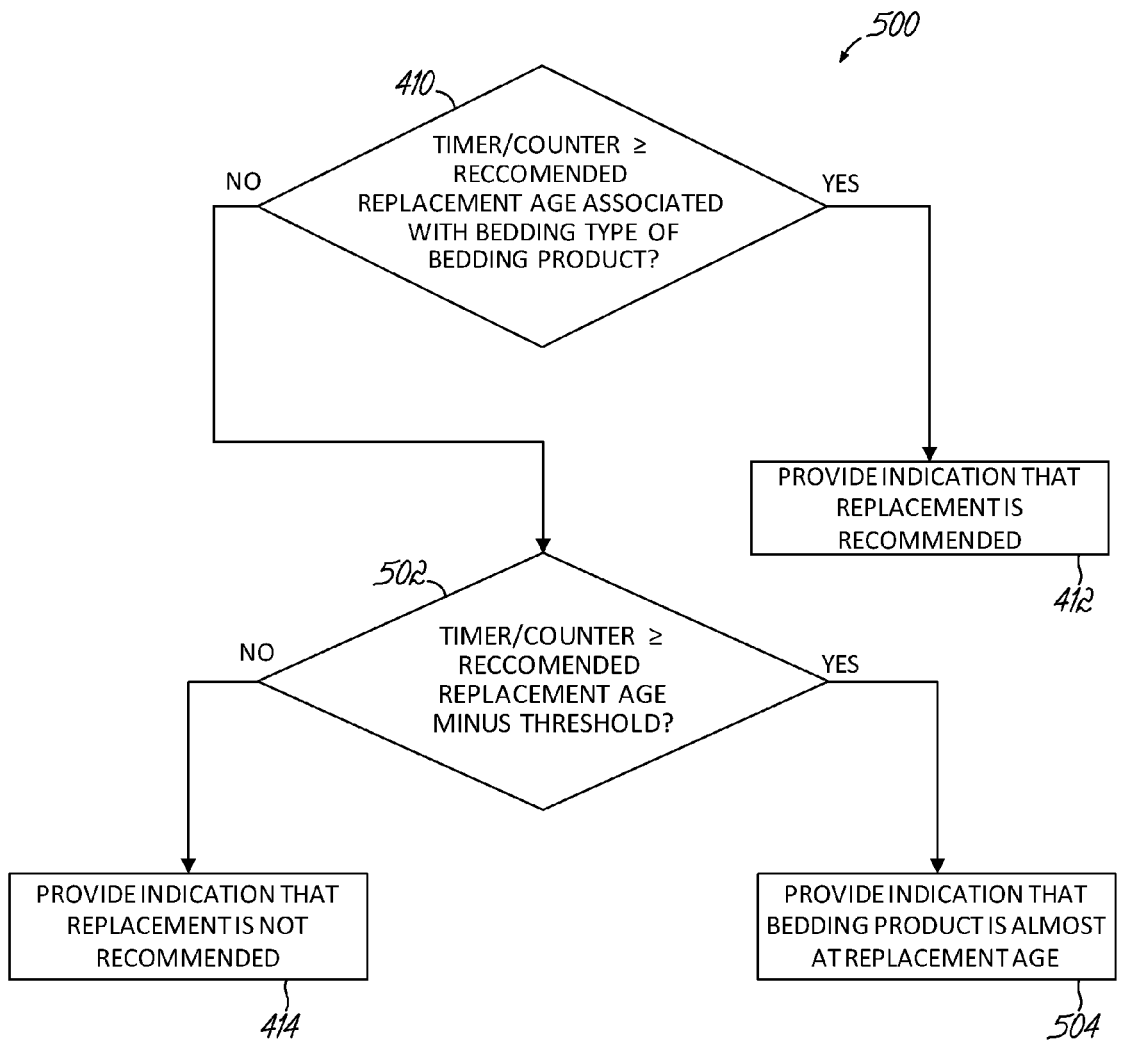
FIG. 15 is a flowchart of an alternative method for providing an indication of whether replacement of the bedding product is recommended.

FIGS. 14 and 15 provide exemplary methods 400 and 500, respectively. One or more of the operations of methods 400 and/or 500 may be performed by the age indicating system 350.

Referring now to method 400, in box 402, an input signal relating to a type of bedding product, such as bedding type signal 358, is received, such as at the control module 352. The received input signal may indicate the type of bedding product, and the control module 352 may utilize the received signal to retrieve the recommended replacement age associated with the indicated bedding type. Alternatively, the received input signal may directly indicate the recommended replacement age of the bedding type for the control module 352.

In box 404, an initiation input is received, such as at the control module 352. The initiation input may include an actuation of the actuator 84 of age indicating device 10b for at least a set period of time, such as ten (10) seconds. In response to such actuation, the actuator 84 may generate an actuator signal 356 representative of the initiation input. In box 406, in response to receiving the initiation input, a timer/counter, such as timer/counter 354, is started, such as by the control module 352. After starting, the timer/counter may be incremented at a plurality of regular time intervals. For example, the timer/counter may be incremented every hour.

After the timer/counter is started, in box 408, a status check input is received, such as at the control module 352. The status check input may include an actuation of the light sensor 82 or the actuator 84 of the age indicating device 10b, such as for two (2) seconds. In response to such actuation, the light sensor 82 or the actuator 84 may generate an actuator signal 356 representative of the status check input. In some embodiments, the status check input includes an actuation of the light sensor 82 or the actuator 84 for a set period of time that is less than the set period of time for the initiation input of box 404.

In response to receiving the status check input, an indication is provided of whether replacement of the bedding product is recommended. This indication may be based on the timer/counter started in box 406 and the recommended replacement age of the bedding type indicated by the input signal received in box 402. In one embodiment, in box 410, a comparison is performed between the timer/counter and the recommended replacement age, such as by the control module 352. If the timer/counter is greater than or equal to the recommended replacement age, then in box 412, an indication is provided that replacement of the bedding product is recommended. For example, control module 352, in response to the comparison, may generate an indicator signal 360 that causes an illumination of LED 308 of visual indicator 302 (FIG. 12), which corresponds to a recommendation to replace the bedding product. Conversely, if the timer/counter is not greater than or equal to the recommended replacement age, then in box 414, an indication is provided that replacement is not yet recommended. For example, control module 352 may generate an indicator signal 360 that causes illumination of LED 304 of visual indicator 302 (FIG. 12), which corresponds to an indication that the bedding product is new, near new, "ok," or simply not ready for replacement.

In some embodiments, after the timer/counter is started in box 406, in box 416, a determination may be made as to whether a reset input has been received. This determination may entail the control module 352 continuously monitoring for receipt of the reset input. In response to the reset input being received, the timer/counter is reset in box 418. In this way, the age indicating device 10b may be restarted at any time. In some embodiments, the reset input includes an actuation of the actuator 84 of the age indicating device 10b, which generates a corresponding actuator signal 356 for the control module 352. The reset input may include an actuation of the actuator 84 for a set period of time equal to the set period of time of the actuation for the initiation input in box 404.

Referring now to FIG. 15, method 500 provides another embodiment for providing an indication of whether replacement of the bedding product is recommended based on the timer/counter and the recommended replacement age of the bedding type indicated in the input signal. As with method 400, method 500 includes box 410 in which a determination is made as to whether the timer/counter is greater than or equal to the recommended replacement age. If so, then, as described above, an indication is provided that replacement of the bedding product is recommended in box 412.

Conversely, if the timer/counter is less than the recommended replacement age, then, in box 502, a determination is made as to whether the timer/counter is greater than or equal to the recommended replacement age minus a set threshold. If so, then in box 504, an indication is provided that the bedding product is nearing its recommended replacement age. Conversely, if the timer is less than the recommended replacement age minus the set threshold, then in box 414, an indication is provided that replacement of the bedding product is not yet recommended, or alternatively, that the bedding product is new, near new, or "ok."

For example, a bedding product may be associated with a bedding type that has a recommended replacement age of five (5) years, and a set threshold may be equal to 20% of the recommended replacement age or one (1) year. If upon comparison, the control module 352 determines that the timer/counter is greater than or equal to five (5) years, then the control module 352 may be configured to generate an indicator signal 360 that causes an indication that replacement of the bedding product is recommended, such as by illuminating LED 308 of visual indicator 302. Alternatively, if the control module 352 determines that the timer/counter is less than five (5) years, then the control module 352 may proceed to determine whether the timer/counter is greater than or equal to the recommended replacement age minus the set threshold, or in this case, greater than or equal to four (4) years. If so, then the control module 352 may be configured to generate an indicator signal 360 that causes an indication that the bedding product is close to its recommended replacement age, such as by illuminating LED 306 of visual indicator 302. However, in this example, if the timer/counter is less than four (4) years, then the control module 352 may be configured to generate an indicator signal 360 that causes an indication that the bedding product is in good condition and no action is recommended, such as by illuminating LED 304 of the visual indicator 302.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

Various program code described herein may be identified based upon the application within that it is implemented in specific embodiments of the invention. However, it should be appreciated that any particular program nomenclature that follows is used merely for convenience, and thus, the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer-readable storage medium having computer-readable program instructions thereon for causing a processor to carry out aspects of the embodiments of the invention.

Computer-readable storage media, which is inherently non-transitory, may include volatile and non-volatile, and removable and non-removable tangible media implemented in any method or technology for storage of information, such as computer-readable instructions, data structures, program modules, or other data. Computer-readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer-readable storage medium should not be construed as transitory signals per se (e.g., radio waves or other propagating electromagnetic waves, electromagnetic waves propagating through a transmission media, such as a waveguide, or electrical signals transmitted through a wire). Computer-readable program instructions may be downloaded to a computer, another type of programmable data processing apparatus, or another device from a computer-readable storage medium or to an external computer or external storage device via a network.

Computer-readable program instructions stored in a computer-readable medium may be used to direct a computer, other types of programmable data processing apparatus, or other devices to function in a particular manner, such that the instructions stored in the computer-readable medium produce an article of manufacture, including instructions that implement the functions, acts, and/or operations specified in the flowcharts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flowcharts, sequence diagrams, and/or block diagrams.

In certain alternative embodiments, the functions, acts, and/or operations specified in the flowcharts, sequence diagrams, and/or block diagrams may be re-ordered, processed serially, and/or processed concurrently consistent with embodiments of the invention. Moreover, any of the flowcharts, sequence diagrams, and/or block diagrams may include more or fewer blocks than those illustrated consistent with embodiments of the invention.

While the invention has been illustrated by the description of embodiments thereof, and while the embodiments have been described in considerable detail, it is not intended to restrict or in any way limit the scope of the appended claims to such detail. Additional advantages and modifications will readily appear to those skilled in the art. Therefore, the invention in its broadest aspects is not limited to the specific details shown and described. The various features disclosed herein may be used in any combination necessary or desired for a particular application. Consequently, departures may be made from the details described herein without departing from the spirit and scope of the claims which follow.

What is claimed is:

1. In combination, a mattress and a mattress age indicating device, the combination comprising:
   the mattress,
   the mattress age indicating device coupled to the mattress and comprising an enclosure;
   an indicating assembly contained within the enclosure, the indicating assembly including a visual indicator, a timer, a controller, a light sensor and a power source; and
   wherein the visual indicator is at least one light emitting diode configured to present a visual indication related to the mattress' age and wherein the timer is initially activated by the light sensor.

2. The combination of claim 1, wherein the enclosure includes a back and a cover, and the indicating assembly is positioned between the back and the cover.

3. The combination of claim 1, wherein after the timer is initially activated, the visual indicator is activated by the controller at any time by a user pushing a test button.

4. The combination of claim 1, further comprising a label providing information used in conjunction with the indication.

5. The combination of claim 1, wherein the device is attached to a surface of a mattress.

6. The combination of claim 5, wherein the device is attached to a side surface of a mattress.

7. The combination of claim 1, wherein the enclosure includes a frame portion, and the device is configured to be attached to the mattress by stitching.

8. The combination of claim 1, further comprising a barcode.

9. The combination of claim 8, wherein the barcode includes a QR code.

10. In combination, a mattress and a mattress age indicating device, the combination comprising:
    the mattress,
    the mattress age indicating device coupled to the mattress and comprising an enclosure;
    an indicating assembly contained within the enclosure, the indicating assembly including a controller, a test button, a visual indicator, a timer and a light sensor, wherein upon the timer being initially activated by the light sensor, the controller initially activates the timer for the first time and upon the test button being pushed after the timer has been initially activated, the controller causes the visual indicator to undergo a sequence of activating and deactivating the visual indicator.

11. The combination of claim 10, wherein the visual indicator comprises at least one LED.

12. The combination of claim 10, wherein the visual indicator includes at least one LED, and the controller selectively activates the at least one LED to provide the single sequence.

13. The combination of claim 10, wherein the enclosure includes a frame portion, the frame portion being sewn to the mattress.

14. The combination of claim 10, wherein the mattress age indicating device is attached to a side surface of the mattress.

15. The combination of claim 10, wherein the visual indicator includes color changing dyes.

16. The combination of claim 10, wherein the visual indicator includes color changing materials.

17. In combination, a bedding product and an age indicating device, the combination comprising:
    the bedding product,
    the age indicating device comprising an indicating assembly including a a timer, a controller, a power source, a light sensor and a visual indicator comprising at least one light emitting diode;
    an enclosure surrounding the indicating assembly;
    wherein the timer, controller and visual indicator cooperate to present a visual indication related to the bedding product's age and the timer is initially activated by the light sensor.

18. The combination of claim 17, wherein the timer may be activated by a user pressing a test button.

19. The combination of claim 17, further comprising a label providing information used in conjunction with the indication.

20. The combination of claim 17, further comprising a QR code.

21. In combination, a bedding product and an age indicating device, the combination comprising:
    the bedding product,
    the age indicating device coupled to the bedding product and comprising an indicating assembly including a light sensor, a timer, a controller, and an indicator;
    an enclosure surrounding the indicating assembly;
    wherein the timer, controller, and indicator cooperate to present an indication related to the bedding product's age, wherein the timer is initially activated by the light sensor.

22. The combination of claim 21, wherein the indicator includes at least one LED.

23. The combination of claim 22, wherein the indicator comprises multiple LEDs, each LED being a different color.

24. The combination of claim 21, wherein the indicator includes at least one LED.

25. The combination of claim 21, wherein the indicator comprises multiple LEDs, each LED being a different color.

* * * * *

UNITED STATES PATENT AND TRADEMARK OFFICE
CERTIFICATE OF CORRECTION

PATENT NO. : 9,773,436 B2  
APPLICATION NO. : 14/982229  
DATED : September 26, 2017  
INVENTOR(S) : Terrance L. Myers et al.

Page 1 of 1

It is certified that error appears in the above-identified patent and that said Letters Patent is hereby corrected as shown below:

In the Specification

Column 2
Line 20, delete the "," after the word "of".

Column 3
Line 38, "FIG. 9 is diagram" should be ---FIG. 9 is a diagram---.

Column 9
Line 15, "are" should be ---is---.

Column 13
Line 35, "are" should be ---is---.

Column 14
Line 44, "service" should be ---surface---.

In the Claims

Column 20
Line 33, "including a a timer" should be ---including a timer---.

Signed and Sealed this
First Day of May, 2018

Andrei Iancu
*Director of the United States Patent and Trademark Office*